United States Patent
Li et al.

(10) Patent No.: US 8,345,459 B2
(45) Date of Patent: Jan. 1, 2013

(54) ARCHITECTURE TO FACILITATE REUSE IN MULTIPLE APPLICATIONS

(75) Inventors: Yuxin Li, North York (CA); Martin J. Kulas, New York, NY (US)

(73) Assignee: ATI Technologies ULC, Markham, Ontario (CA)

( * ) Notice: Subject to any disclaimer, the term of this patent is extended or adjusted under 35 U.S.C. 154(b) by 147 days.

(21) Appl. No.: 13/024,474

(22) Filed: Feb. 10, 2011

(65) Prior Publication Data

US 2012/0210096 A1    Aug. 16, 2012

(51) Int. Cl.
*G11C 5/06* (2006.01)

(52) U.S. Cl. ........ 365/63; 365/72; 365/191; 365/189.08

(58) Field of Classification Search ............ 365/63, 365/72, 191, 189.08
See application file for complete search history.

(56) References Cited

U.S. PATENT DOCUMENTS

| | | | | |
|---|---|---|---|---|
| 7,051,150 | B2 * | 5/2006 | Naumann et al. | 710/317 |
| 7,130,942 | B2 * | 10/2006 | Gemelli et al. | 710/105 |
| 7,139,860 | B2 * | 11/2006 | Walker et al. | 710/306 |
| 8,026,739 | B2 * | 9/2011 | Sullam et al. | 326/39 |
| 8,134,876 | B2 * | 3/2012 | Choi et al. | 365/193 |
| 8,233,303 | B2 * | 7/2012 | Best et al. | 365/51 |
| 2007/0147522 | A1 * | 6/2007 | Seto et al. | 375/260 |
| 2009/0244997 | A1 | 10/2009 | Searles et al. | |
| 2010/0198574 | A1 * | 8/2010 | Veller | 703/14 |

OTHER PUBLICATIONS

Merritt, Rick, "Hot Chips: Inside AMD's Two New x86 Cores," URL: <http://www.eetimes.com/GeneralDisplayPrintViewContent?contentItemID=4206347>, Aug. 23, 2010, 4 pages.

* cited by examiner

*Primary Examiner* — Viet Q Nguyen
(74) *Attorney, Agent, or Firm* — Zagorin O'Brien Graham LLP

(57) ABSTRACT

A method includes generating, from a representation of a first integrated circuit, a representation of a second integrated circuit. The representation of the first integrated circuit includes a plurality of representations of operative memory channel interfaces including a representation of a first operative memory channel physical interface. The representation of the second integrated circuit includes a representation of a pseudo-memory channel physical interface and at least a representation of a second operative memory channel physical interface. The generating includes replacing an instantiation of a first circuit of the representation of the first operative memory channel physical interface with an instantiation of a second circuit. The instantiation of the second circuit is a representation of a circuit that is logically equivalent to a first circuit represented by the instantiation of the first circuit.

22 Claims, 6 Drawing Sheets

ARCHITECTURE TO FACILITATE REUSE IN MULTIPLE APPLICATIONS

BACKGROUND

1. Field of the Invention

The invention is related to computing systems and more particularly to memory interfaces in computing systems.

2. Description of the Related Art

A typical processing system includes an off-chip, system memory and a system-on-a-chip (SOC) integrated circuit including a system memory interface and one or more processing blocks and related hardware. The system memory interface provides an interface for one or more memory channels that communicate with one or more corresponding memory modules. The number of memory channels included in the system memory interface differs in SOCs according to the final application of the SOCs (e.g., server, desktop, laptop, or ultra-low power device).

SUMMARY OF EMBODIMENTS

In at least one embodiment of the invention, a method includes generating, from a representation of a first integrated circuit, a representation of a second integrated circuit. The representation of the first integrated circuit includes a plurality of representations of operative memory channel interfaces including a representation of a first operative memory channel physical interface. The representation of the second integrated circuit includes a representation of a pseudo-memory channel physical interface and at least a representation of a second operative memory channel physical interface. The generating includes replacing an instantiation of a first circuit of the representation of the first operative memory channel physical interface with an instantiation of a second circuit. The instantiation of the second circuit is a representation of a circuit that is logically equivalent to a first circuit represented by the instantiation of the first circuit.

In at least one embodiment of the invention, an integrated circuit includes a first operative memory channel physical interface including a first circuit. The integrated circuit includes a pseudo-memory channel physical interface including a second circuit that is a logical equivalent of the first circuit. The pseudo-memory channel physical interface is operative to provide an output according to a same logical function as an output provided by the first operative memory channel physical interface. The pseudo-memory channel physical interface is inoperative to provide the output with at least one of a same voltage characteristic and a same timing characteristic as the output of the first memory channel physical interface. In at least one embodiment of the invention, the first circuit is an analog input/output circuit and the second circuit is a digital buffer circuit. In at least one embodiment of the invention, the first circuit is a delay line circuit of a delay-locked loop and the second circuit is a digital buffer circuit.

In at least one embodiment of the invention, a tangible computer-readable medium encodes a representation of an integrated circuit that comprises a first operative memory channel physical interface including a first circuit. The pseudo-memory channel physical interface includes a second circuit that is a logical equivalent of the first circuit. The pseudo-memory channel physical interface is operative to provide an output according to a same logical function as an output provided by the first operative memory channel physical interface. The pseudo-memory channel physical interface is inoperative to provide the output with at least one of a same voltage characteristic and a same timing characteristic as the output of the first memory channel physical interface.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
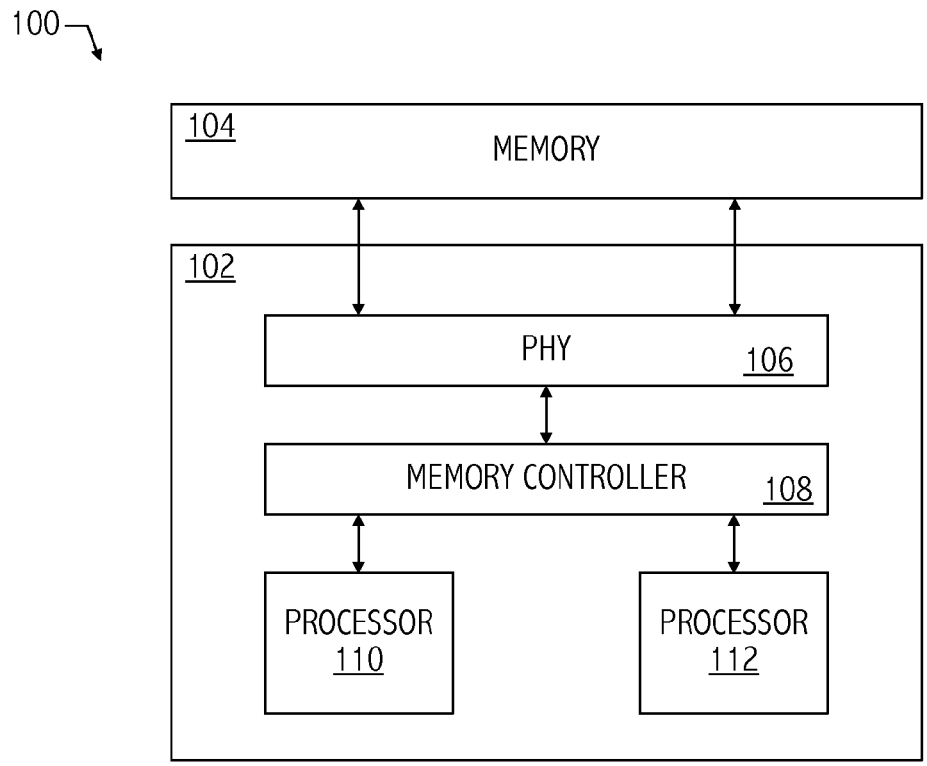
FIG. 1 illustrates a functional block diagram of an exemplary computing system.

Referring to FIG. 1, an exemplary processing system includes an off-chip, system memory (e.g., system memory 104) and a system-on-a-chip (SOC) integrated circuit (e.g., SOC 102). In at least one embodiment of system 100, system memory 104 includes double data rate synchronous dynamic random access memory (i.e., DDR SDRAM memory or DDR memory). In at least one embodiment, memory 104 includes DDR memory compliant with a DDR SDRAM memory standard, DDR2 SDRAM memory standard, DDR3 SDRAM memory standard, other DDR SDRAM memory standard, or other suitable memory standard. Although described with reference to a particular DDR SDRAM memory, techniques described herein are applicable to systems including memory compliant with other memory standards.

Figure 2:
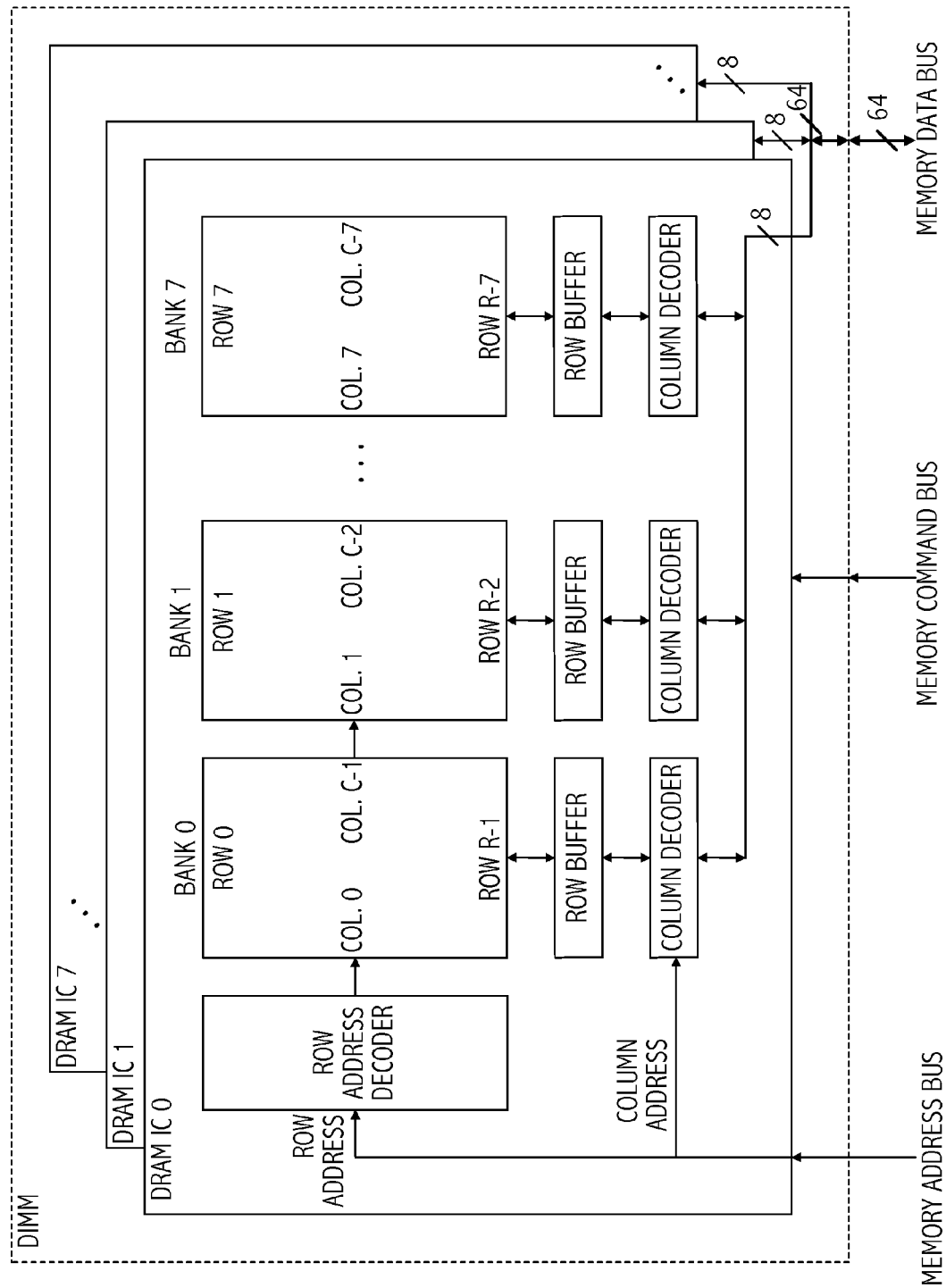
FIG. 2 illustrates a functional block diagram of an exemplary system memory.

Referring to FIG. 2, in at least one embodiment, system memory 104 includes multiple memory modules (e.g., multiple dual in-line memory module, i.e., DIMM), which are accessed in parallel as separate memory channels. In at least one embodiment of system memory 104, each memory module includes multiple memory integrated circuits, which are accessed in parallel. In at least one embodiment of system memory 104, each memory integrated circuit includes a data interface (e.g., 8-bit data interface) that is combined with data interfaces of other memory integrated circuits to form a wider data interface (e.g., 64-bit data interface). In at least one embodiment of system memory 104, each memory integrated circuit includes multiple independent memory banks, which can be accessed in parallel. In at least one embodiment of the memory system, each memory bank includes a two-dimensional array of cells, including multiple rows and columns. A location of the memory is accessed using a memory address including bank, row, and column fields. In at least one embodiment of the memory system, only one row in a bank can be accessed at a time and the row data is stored in a row buffer dedicated to that bank. An activate command moves a row of data from the memory array into the row buffer. Once a row is in the row buffer, a read or write command can read/write data from/to the associated memory address. Thus, the latency of a memory command depends on whether or not a corresponding row is in a row buffer of an associated memory bank.

In at least one embodiment of system memory 104, if the contents of a memory address are in the row buffer (i.e., the memory address hits the row buffer), then a memory controller only needs to issue a read or write command to the memory bank, which has a memory access latency of $t_{CL}$ or $t_{WL}$, respectively. If the contents of the memory address are not present in the row buffer (i.e., the memory address misses the row buffer), then the memory controller needs to precharge the row buffer, issue an activate command to move a row of data into the row buffer, and then issue a read or write command to the memory bank, which has an associated memory access latency of $t_{RCD}+t_{CL}+t_{RP}$ or $t_{RCD}+t_{WL}+t_{RP}$, respectively. Note that the memory architecture of FIG. 2 is exemplary only and the teachings described herein apply to systems including other memory architectures.

Referring back to FIG. 1, SOC 102 includes a memory controller (e.g., memory controller 108), which is an intermediary between one or more processors (e.g., processors 110 and 112) and system memory 104 that prioritizes and schedules memory requests (e.g., reads and writes from and to main memory, respectively). As referred to herein, a processor is a central processing unit, digital signal processor, graphics processor, processor core, core, or other suitable processing circuit. The memory controller schedules memory requests from the processors by prioritizing the memory requests, translating the memory requests into a sequence of memory commands, and issuing to memory the sequence of memory commands associated with a highest priority memory request.

System-on-a-chip 102 includes a physical memory interface (i.e., physical layer or PHY, e.g., PHY 106) that encodes data received from memory controller 108 and transmits that encoded data to system memory 104 and decodes data received from system memory 104 and transmits that decoded data to memory controller 108. In at least one embodiment, PHY 106 converts data transfer abstractions (e.g., read and write instructions received from memory controller 108) into particular physical voltages that satisfy particular timing specifications of system memory 104 (e.g., DDR voltage and timing specifications). The circuits included in PHY 106 to provide those conversion functions, e.g., input/output pads and delay-locked loops, comprise a substantial portion of area within PHY 106 and consume a substantial amount of power.

Figure 3:
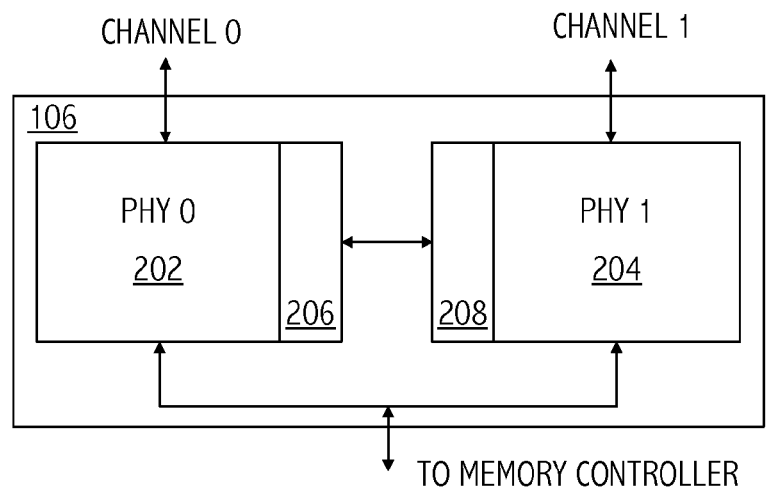
FIG. 3 illustrates a functional block diagram of a memory physical interface.
Figure 4:
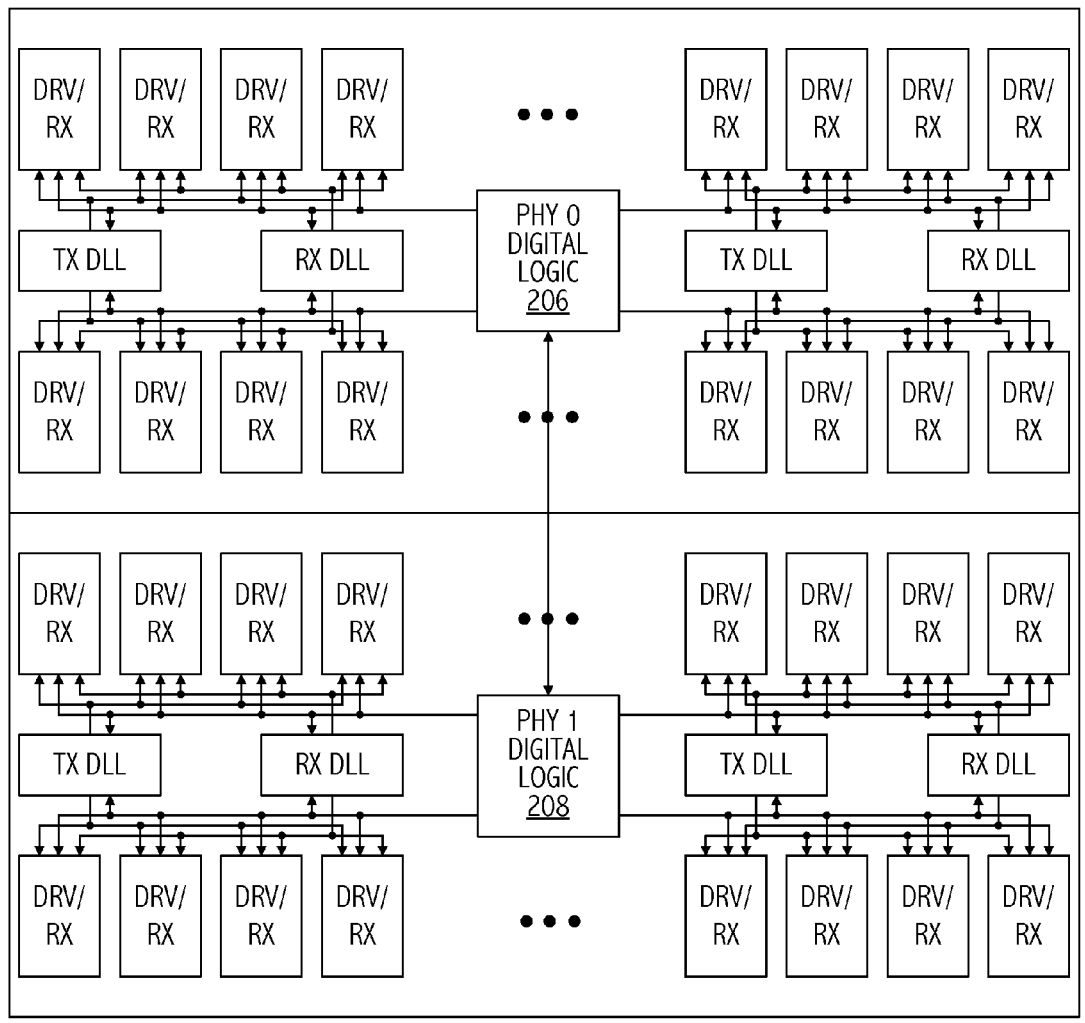
FIG. 4 illustrates a functional block diagram of the exemplary memory physical interface of FIG. 3.

Referring to FIGS. 3 and 4, in at least one embodiment, PHY 106 is designed for a particular application having multiple memory channels and PHY 106 includes a PHY for each of a plurality of memory channels (e.g., PHY 0 and PHY 1 for CHANNEL 0 and CHANNEL 1, respectively). As a result of efficient design techniques, PHY 106 includes physical memory interface circuits corresponding to each channel (e.g., circuits 202 and 204 of PHY 0 and PHY 1, respectively), and also includes resources shared among a plurality of channels and/or resources that are interdependent on resources of at least one other channel (e.g., circuits 206 and 208, which are shared among PHY 0 and PHY 1). In at least one embodiment of PHY 106, circuits 202 and 204 include delay-locked loop circuits (e.g., TX DLLs and RXDLLs) and analog input/output circuits (e.g., DRV/RX circuits), and circuits 206 and 208 include digital logic circuits (e.g., control circuits) that are interdependent and/or shared between PHY 0 and PHY 1.

Although efficiencies in design (e.g., shared, interdependent logic) may reduce cost for the multi-channel application, those efficiencies in design result in inefficiencies when reusing the design for another target application with fewer memory channels. The lack of modularity in design requires a substantial amount of design time to either redesign the PHY for the target application or extract one or more integrated circuit representations of one or more unneeded channels from an integrated circuit representation of PHY 106, including extracting any inter-channel dependencies from the integrated circuit representation of PHY 106. The redesign, circuit extraction, and verification of a new integrated circuit representation results in longer time to market for an integrated circuit manufactured based on the integrated circuit representation having inter-channel dependencies than an integrated circuit manufactured based on a modified integrated circuit representation based on a modular design. As referred to herein, a representation of an integrated circuit (i.e., an integrated circuit representation) includes at least one of a hardware description language representation, a schematic compatible with electronic design automation tools, a netlist, other integrated circuit representation, or any combination thereof. The integrated circuit representation may be encoded in at least one tangible computer-readable medium. As referred to herein, a tangible computer-readable medium includes at least a disk, tape, or other magnetic, optical, or electronic storage medium.

Figure 5:
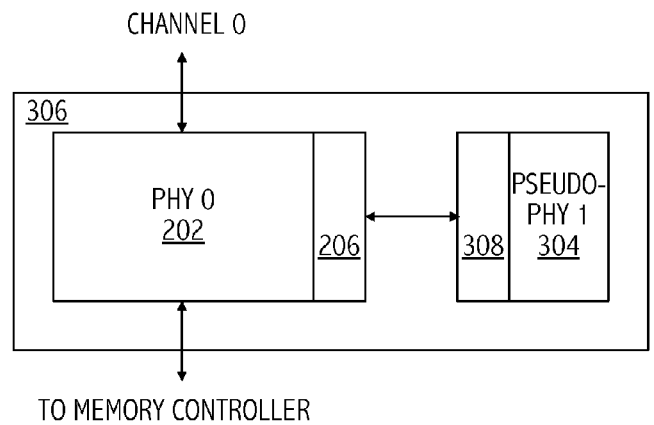
FIG. 5 illustrates a functional block diagram of a memory physical interface consistent with at least one embodiment of the invention.
Figure 10:
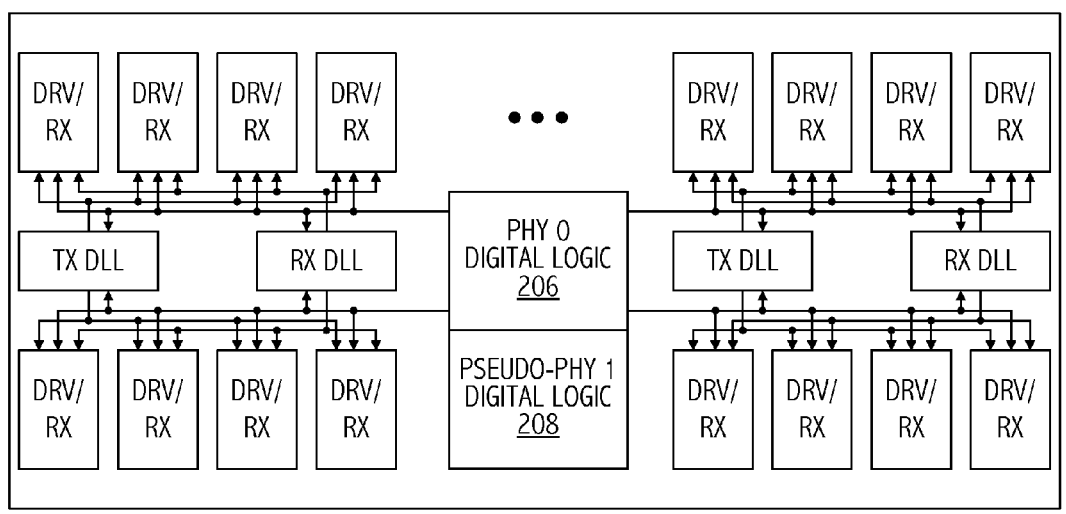
FIG. 10 illustrates a functional block diagram of the memory physical interface of FIG. 5 consistent with at least one embodiment of the invention.
Figure 6A:
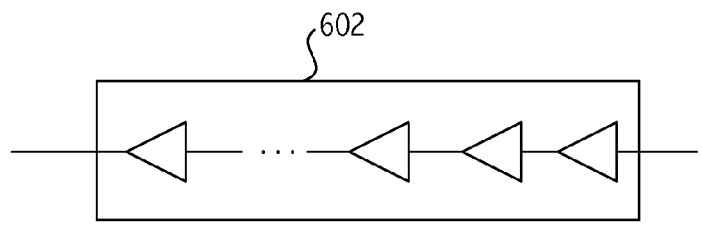
FIGS. 6A and 6B illustrate functional block diagrams of an exemplary delay line of a transmitter delay-locked loop and an exemplary delay line of a receiver delay-locked loop.
Figure 7A:
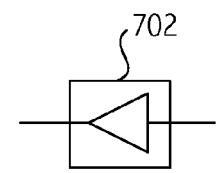
FIGS. 7A and 7B illustrate functional block diagrams of exemplary logical equivalents of the delay lines of the exemplary transmitter and receiver delay-locked loops of FIGS. 6A and 6B, respectively, consistent with at least one embodiment of the invention.
Figure 6B:
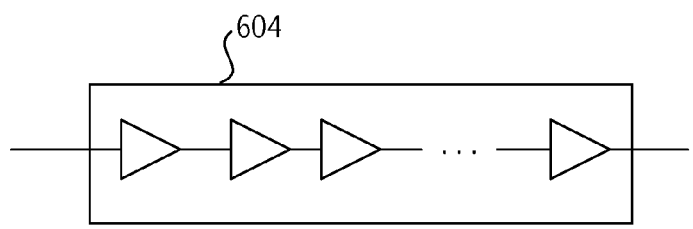
Figure 7B:
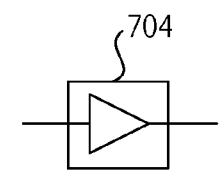
Figure 8A:
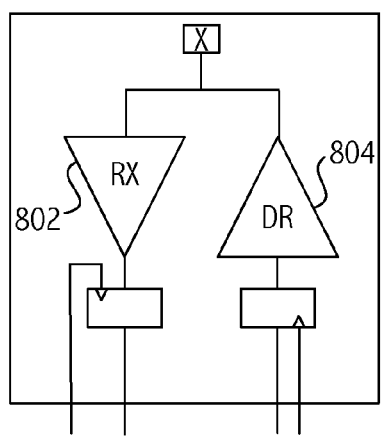
FIGS. 8A and 8B illustrate functional block diagrams of portions of exemplary input/output circuits.
Figure 8B:
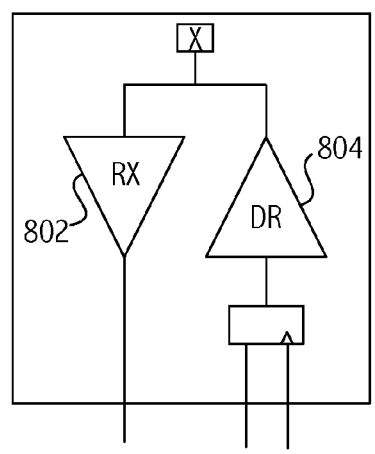
Figure 9A:
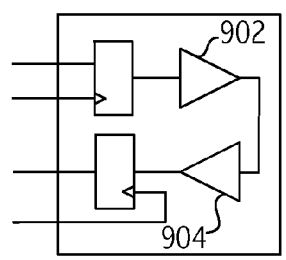
FIGS. 9A and 9B illustrate functional block diagrams of exemplary logical equivalents of the input/output circuits of FIGS. 8A and 8B, consistent with at least one embodiment of the invention.
Figure 9B:
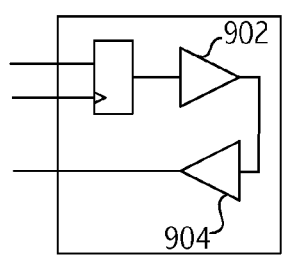

Referring to FIG. 5, a technique for designing a physical interface expedites integration of an existing physical interface designed for a multi-channel application into an SOC for a target application having fewer channels than the existing PHY. In at least one embodiment of the technique, the design of the physical interface circuit (e.g., PHY 306) begins with an existing integrated circuit representation, e.g., the integrated circuit representation of PHY 106 of FIG. 1, which includes a representation of at least one memory channel not required by the target application for PHY 306 of FIG. 5. Physical interface layer 306 and a corresponding integrated circuit representation are separated into a fully operational PHY (e.g., PHY j) and a representation thereof, respectively, and a pseudo-PHY (e.g., pseudo-PHY 1, i.e., circuit 304) and a corresponding representation thereof, respectively. As referred to herein, a pseudo-PHY is not fully operational. A pseudo-PHY and simulation of its corresponding representation provide outputs according to the same logical functions as a fully-operational PHY and simulation of its corresponding representation, but do not provide the outputs with the same voltage characteristics and/or the same timing characteristics as the fully-operational PHY and simulation of its representation. The one or more memory channels that are required for the target application reside in PHY 0. In at least one embodiment, the pseudo-PHY is not directly accessed by the target application and is not coupled to the memory system. Circuitry associated with superfluous memory channels (i.e., memory channels not required by the target application for PHY 306) and corresponding circuit representations reside in pseudo-PHY 1 and its corresponding representation. In at least one embodiment of PHY 306, PHY 0 continues to contain all of the circuitry required to communicate with populated memories on a motherboard (e.g., fully operational analog and digital circuitry). In at least one embodiment, pseudo-PHY 1 and its corresponding representation include only digital circuitry and instantiations of digital circuits, respectively, that perform the logical functions of a memory PHY.

Since the principal function of the PHY is to convert data transfer abstractions in the SOC memory controller into particular physical voltages that satisfy particular timing specifications, the circuits tasked with these functions comprise a significant portion of the area and consume a substantial amount of a power budget for PHY 306. Those circuits are present in PHY 0. Typically, those circuits are analog or custom circuits. However, in the pseudo-PHY 1, those circuits are replaced with logically equivalent digital circuit proxies that have lower power consumption and/or occupy less area than the circuitry required to implement the particular voltage and timing specifications. In at least one embodiment of pseudo-PHY 1, instead of instantiating a delay-locked loop in its entirety, a delay line of a delay-locked loop is replaced with a single delay buffer where closed-loop delay accuracy is not required in the unused channel(s). For example, referring to FIGS. 6A, 6B, 7A, and 7B, a delay line of an exemplary transmit delay locked loop (e.g., delay line 602) or receive delay-locked loop (e.g., delay line 604) of PHY 0 is replaced with a small standard cell delay buffer (e.g., buffer 702 and buffer 704, respectively) in pseudo-PHY 1. In at least one embodiment of pseudo-PHY 1, a digital, standard cell buffer is instantiated in lieu of a substantially larger receiver or output driver in an I/O pad custom circuit. For example, referring to FIGS. 8A, 8B, 9A, and 9B, receiver 802 and driver 804 of at least one I/O pad custom circuit of PHY 0 are substantially large and are replaced by small standard cell delay buffers 902 and 904 in pseudo-PHY 1, which are substantially smaller than receiver 802 and driver 804. However, note that digital proxies do not replace custom circuitry where the precision is required to maintain the logical functionality of PHY 0. The logically equivalent digital circuit proxies are present to provide functionality that is shared across channels. Accordingly, test benches and other verification tools that were designed for PHY 106 may be reused for verification of PHY 306.

In at least one embodiment of PHY 306, a channel in the pseudo-PHY is analogous to a memory channel not populated with a memory module (i.e., the pseudo-PHY corresponding to an empty memory channel on a motherboard of a multi-channel memory system), which in at least one embodiment of PHY 306 is allowed by the target application (e.g., allowed by a DDR3 interface and multichannel memory controller specification). In at least one embodiment, a final system including PHY 306 does not access that unpopulated channel in operation.

Figure 11:
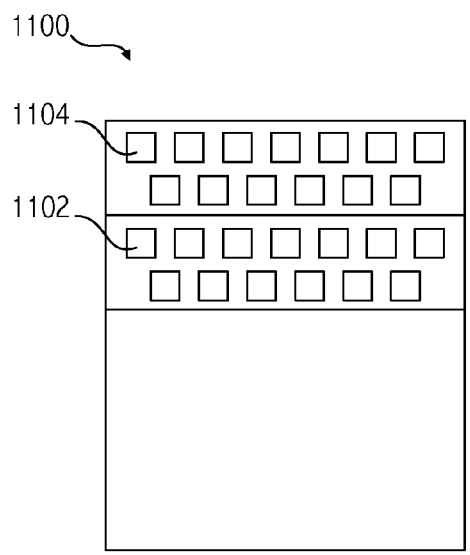
FIG. 11 illustrates a functional block diagram of an exemplary integrated circuit die including the exemplary memory physical interface of FIG. 3.
Figure 12:
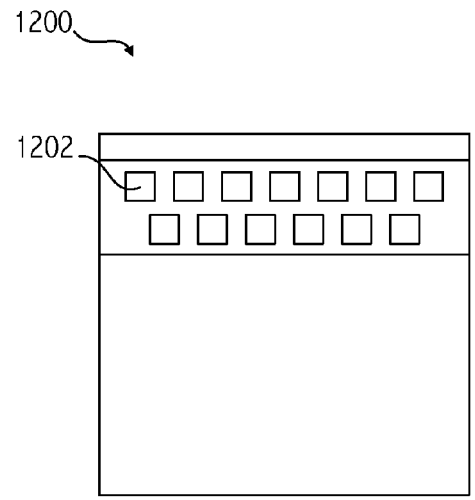
FIG. 12 illustrates a functional block diagram of an integrated circuit die including the memory physical interface of FIG. 9 consistent with at least one embodiment of the invention.
Figure 13:
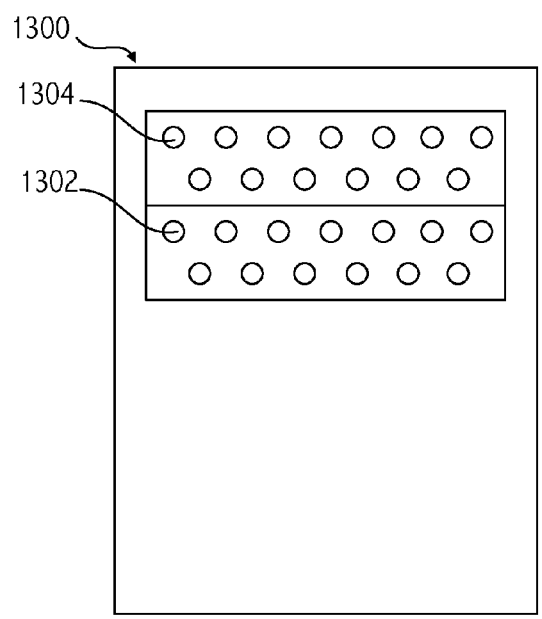
FIG. 13 illustrates an integrated circuit package for the integrated circuit die including the exemplary memory physical interface of FIGS. 3, 4, and 11.
Figure 14:
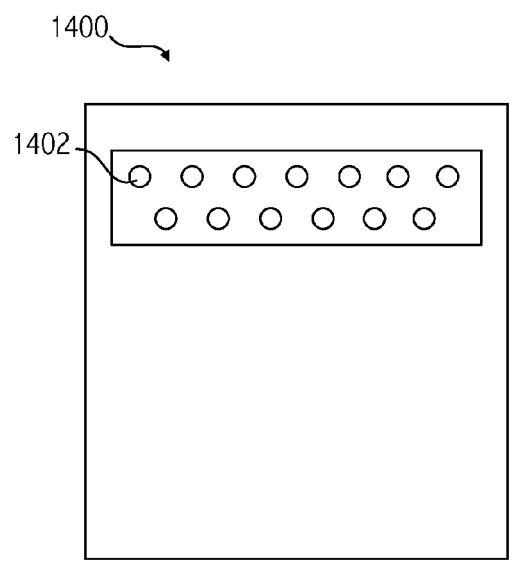
FIG. 14 illustrates an integrated circuit package for the integrated circuit die including the memory physical interface of FIGS. 5, 10, and 12 consistent with at least one embodiment of the invention.

Referring to FIG. 11, in at least one embodiment, an integrated circuit die (e.g., die 1100) including PHY 0 and PHY 1 and based on a corresponding representation of an integrated circuit described above, includes a set of bonding pads (e.g., bonding pads 1102 and 1104, respectively) for each of PHY 0 and PHY 1. In general, bonding pads are formed in a conducting layer of the integrated circuit die and require an opening in the integrated circuit passivation layer. In at least one embodiment of die 1100, the bonding pads are coupled to corresponding ball grid array bumps (i.e., "BGA bumps" or "bumps") of a suitable package (e.g., bumps 1302 and 1304, respectively, of package 1300 of FIG. 13). Referring to FIGS. 5, 11, and 13, in at least one embodiment, die 1100 includes PHY 306 and bonding pads 1104, which correspond to pseudo-PHY 1 and are not bonded to bumps 1304 of package 1300. Referring to FIGS. 5, 12, and 14, in at least one embodiment of an integrated circuit die (e.g., die 1200) including PHY 306 and based on a corresponding representation of an integrated circuit described above, PHY 0 is coupled to bonding pads 1202 which are coupled to bumps 1402. However, in at least one embodiment, die 1200 does not include any bonding pads corresponding to pseudo-PHY1 and no corresponding bumps are included in package 1400. In at least one embodiment of die 1200, the reduction in bonding pads reduces the required area for the integrated circuit die. In at least one embodiment of die 1200, the reduction in bonding pads and/or integrated circuit die area reduces the size of package 1400, and/or reduces the cost of a motherboard for the target application. Note that the description of a ball grid array package is exemplary only and techniques described herein apply to integrated circuits packaged using other packaging techniques.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., HDL, Verilog, GDSII data) of such circuits, systems, and methods, all as described herein, and as defined in the appended claims. In addition, the computer readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment including DDR memories, one of skill in the art will appreciate that the teachings herein can be utilized with memories compliant with other standards. In addition, techniques described herein may be applied to other multi-channel integrated circuit architectures other than memory PHY designs. Variations and modifications of the embodiments disclosed herein, may be made based on the description set forth herein, without departing from the scope and spirit of the invention as set forth in the following claims.

What is claimed is:

1. A method comprising:
generating, from a representation of a first integrated circuit, a representation of a second integrated circuit,
wherein the representation of the first integrated circuit includes a plurality of representations of operative memory channel interfaces including a representation of a first operative memory channel physical interface,
wherein the representation of the second integrated circuit includes a representation of a pseudo-memory channel physical interface and at least a representation of a second operative memory channel physical interface, and
wherein the generating includes replacing an instantiation of a first circuit of the representation of the first operative memory channel physical interface with an instantiation of a second circuit, the instantiation of the second circuit being a representation of a circuit that is logically equivalent to a first circuit represented by the instantiation of the first circuit.

2. The method, as recited in claim 1, wherein a pseudo-memory channel physical interface corresponding to the representation of the pseudo-memory channel physical interface is operative to provide an output according to a same logical function as an output of a first memory channel physical interface corresponding to the representation of the first operative memory channel interface, and the pseudo-memory channel physical interface is inoperative to provide the output with at least one of a same voltage characteristic and a same timing characteristic as the output of the first memory channel physical interface.

3. The method, as recited in claim 1, wherein the instantiation of the first circuit corresponds to an analog input/output circuit and the instantiation of the second circuit corresponds to a digital buffer circuit.

4. The method, as recited in claim 1, wherein the instantiation of the first circuit corresponds to a delay line of a delay-locked loop and the instantiation of the second circuit corresponds to a digital buffer circuit.

5. The method, as recited in claim 1, wherein the representations of the first and second operative memory channel physical interfaces correspond to circuits having substantially equivalent logical functions, voltage characteristics, and timing characteristics.

6. The method, as recited in claim 5, wherein the representations of the first operative memory channel physical interface and the pseudo-memory channel physical interface correspond to circuits having substantially equivalent logical functions and substantially different timing characteristics.

7. The method, as recited in claim 5, wherein the representation of the first operative memory channel physical interface corresponds to a circuit substantially larger than a circuit corresponding to the representation of the pseudo-memory channel physical interface.

8. The method, as recited in claim 1, further comprising:
verifying the representation of the second integrated circuit using a logical test bench for the representation of the first integrated circuit.

9. The method, as recited in claim 1, wherein a pseudo-memory channel physical interface corresponding to the representation of the pseudo-memory channel physical interface includes circuitry shared with a second operative memory channel physical interface corresponding to the representation of the second operative memory channel physical interface.

10. The method, as recited in claim 1, wherein a first operative memory channel physical interface corresponding to the representation of the first operative memory channel physical interface is operative to communicate signals between a memory controller and a memory coupled to a second integrated circuit corresponding to the representation of the second integrated circuit, and a pseudo-memory channel interface corresponding to the representation of the pseudo-memory channel physical interface is inoperative.

11. The method, as recited in claim 1, wherein a second operative memory channel physical interface corresponding to the representation of the second operative memory channel physical interface is compliant with a double data rate synchronous dynamic random access memory.

12. An integrated circuit comprising:
a first operative memory channel physical interface including a first circuit; and
a pseudo-memory channel physical interface including a second circuit that is a logical equivalent of the first circuit, the pseudo-memory channel physical interface being operative to provide an output according to a same logical function as an output provided by the first operative memory channel physical interface, the pseudo-memory channel physical interface being inoperative to provide the output with at least one of a same voltage characteristic and a same timing characteristic as the output of the first memory channel physical interface.

13. The integrated circuit, as recited in claim 12, wherein the first circuit is an analog input/output circuit and the second circuit is a digital buffer circuit.

14. The integrated circuit, as recited in claim 12, wherein the first circuit is a delay line of a delay-locked loop and the second circuit is a digital buffer circuit.

15. The integrated circuit, as recited in claim 12, wherein the first operative memory channel physical interface and the pseudo-memory channel physical interface have substantially equivalent logical functions and substantially different timing characteristics.

16. The integrated circuit, as recited in claim 12, wherein the first operative memory channel physical interface is substantially larger than the pseudo-memory channel physical interface.

17. The integrated circuit, as recited in claim 12, wherein the pseudo-memory channel physical interface includes circuitry shared with the second operative memory channel physical interface.

18. The integrated circuit, as recited in claim 12, further comprising:
bonding pads coupled to the first operative memory channel physical interface, wherein the pseudo-memory channel physical interface is not coupled to bonding pads.

19. The integrated circuit, as recited in claim 12, wherein the first operative memory channel physical interface is operative to communicate signals between a memory controller and a memory coupled to the second integrated circuit, and the pseudo-memory channel interface is inoperative.

20. The integrated circuit, as recited in claim 12, wherein the first operative memory channel physical interface is compliant with a double data rate synchronous dynamic random access memory.

21. The integrated circuit, as recited in claim 12, wherein the first operative memory channel physical interface includes at least one input/output pad and the pseudo-memory channel interface includes fewer pads than the first operative memory channel physical interface.

22. A tangible computer-readable medium encoding a representation of an integrated circuit that comprises:
a first operative memory channel physical interface including a first circuit; and a pseudo-memory channel physical interface including a second circuit that is a logical equivalent of the first circuit, the pseudo-memory channel physical interface being operative to provide an output according to a same logical function as an output provided by the first operative memory channel physical interface, the pseudo-memory channel physical interface being inoperative to provide the output with at least one of a same voltage characteristic and a same timing characteristic as the output of the first memory channel physical interface.

* * * * *